Oct. 26, 1965  J. J. RENARD  3,213,731
PAPER LOG CUTTING APPARATUS
Filed Aug. 4, 1964  6 Sheets-Sheet 1
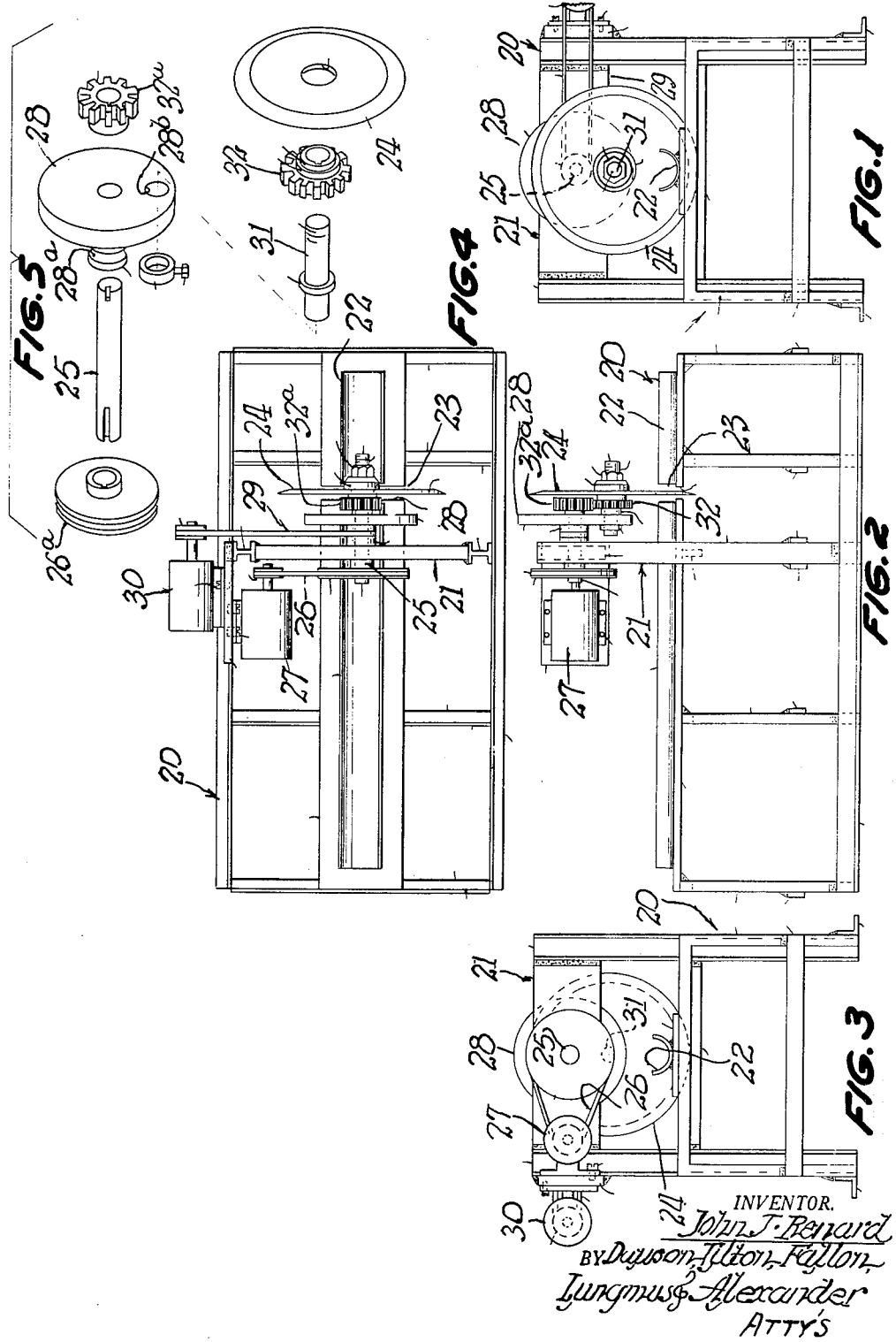
INVENTOR.
John J. Renard
BY Dawson, Tilton, Fallon,
Lungmus & Alexander
ATTYS

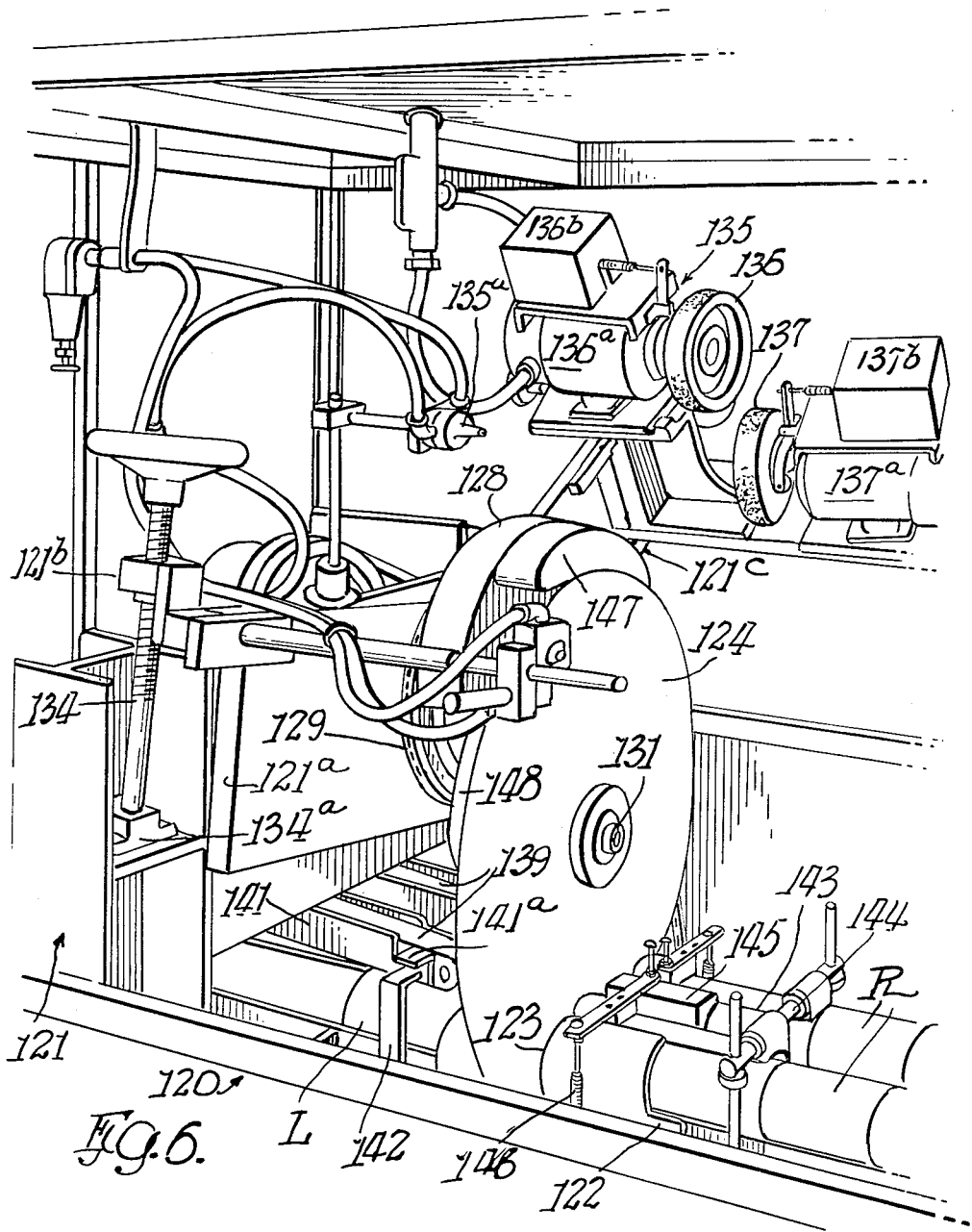

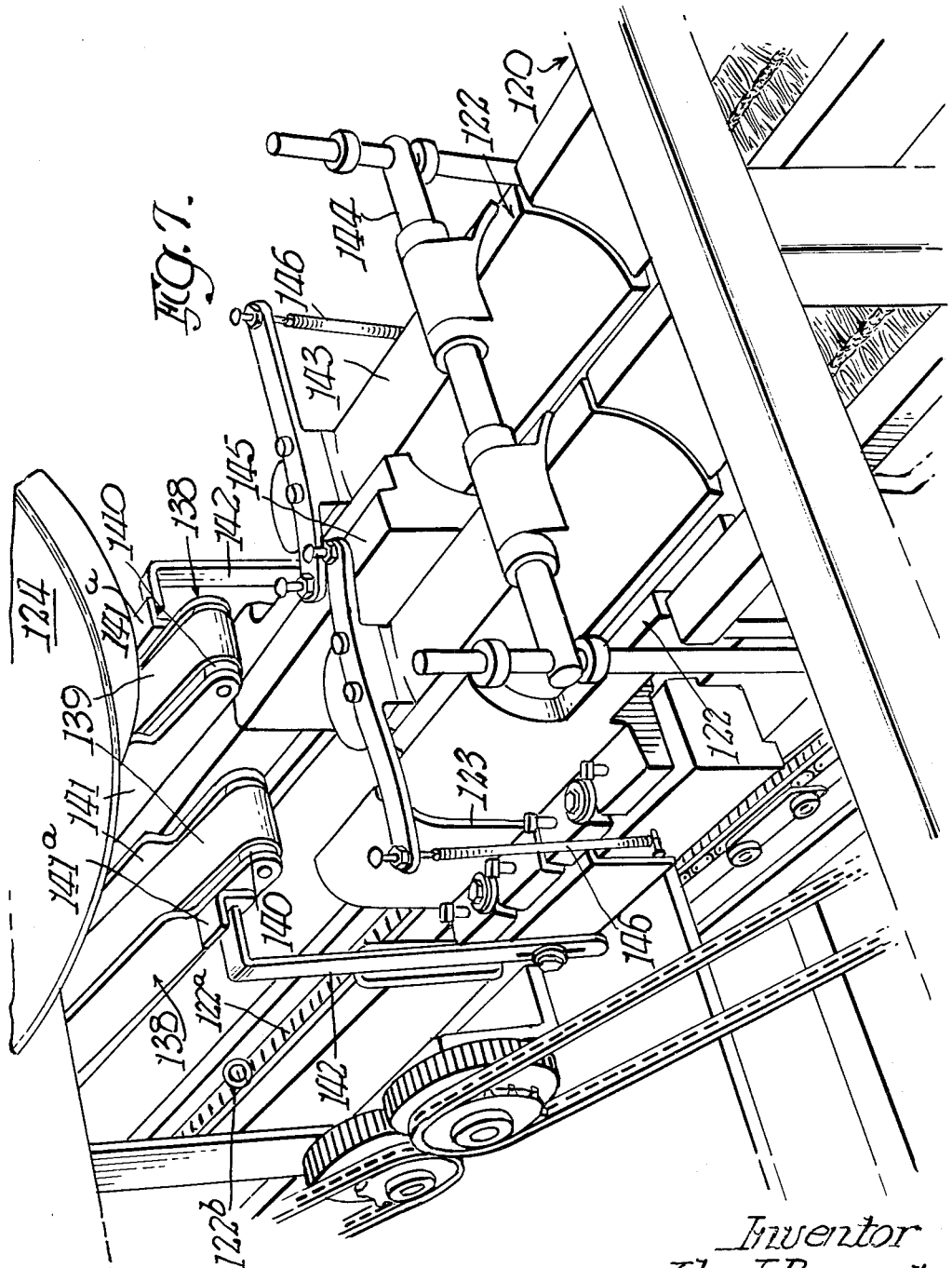

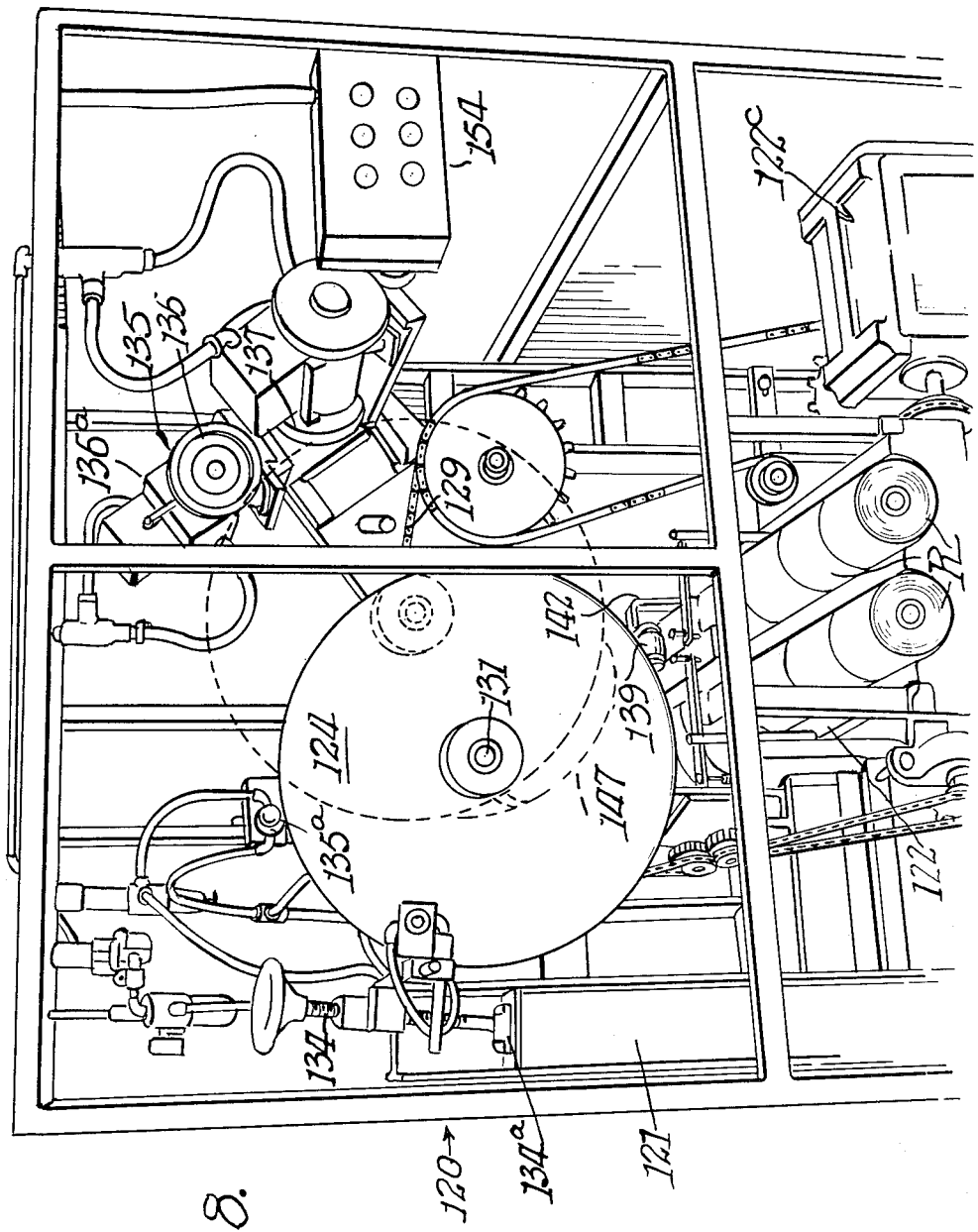

Oct. 26, 1965  J. J. RENARD  3,213,731
PAPER LOG CUTTING APPARATUS
Filed Aug. 4, 1964  6 Sheets-Sheet 5
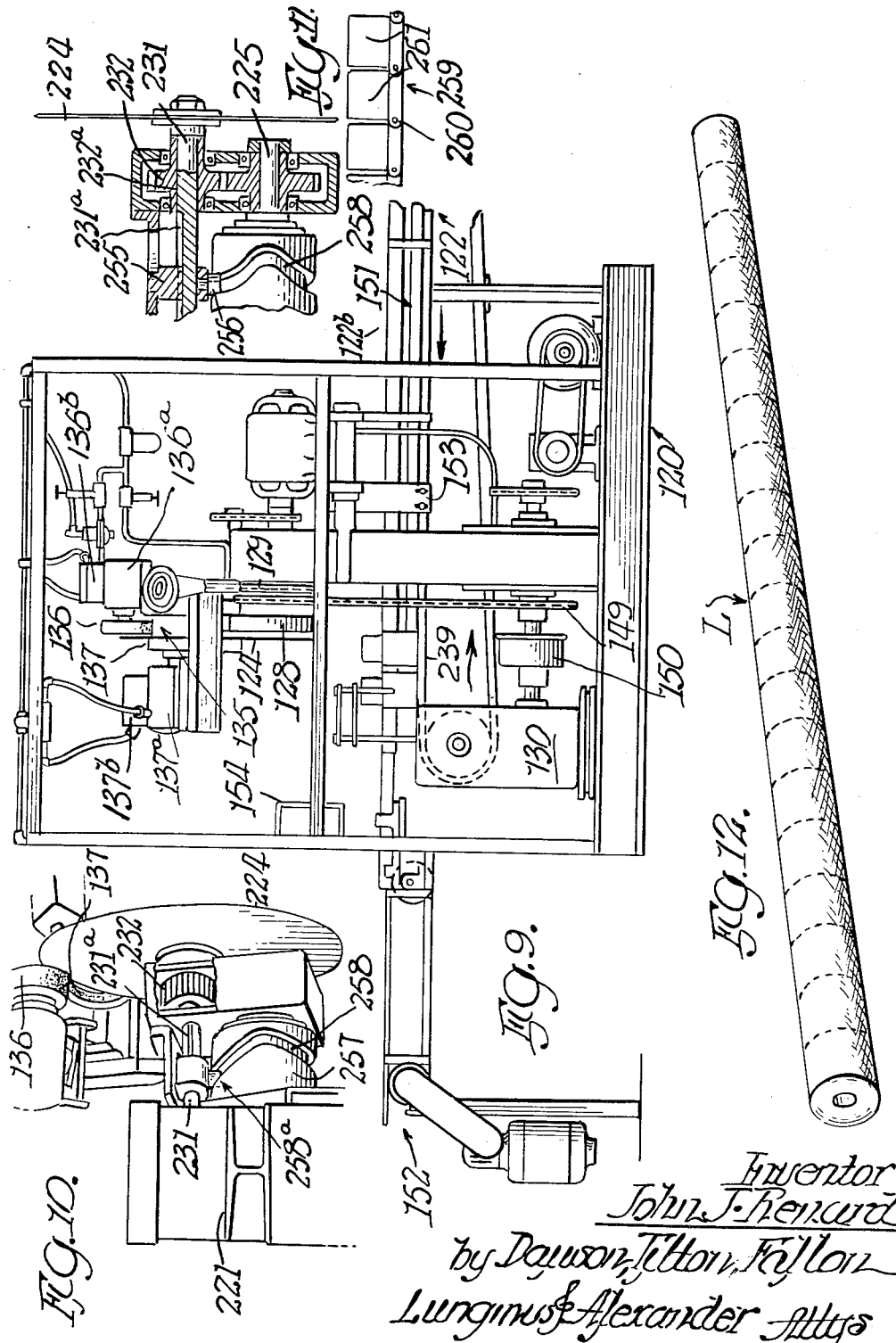
Inventor
John J. Renard
by Dawson, Tilton, Fallon
Lungmus & Alexander Attys Oct. 26, 1965    J. J. RENARD    3,213,731
PAPER LOG CUTTING APPARATUS
Filed Aug. 4, 1964    6 Sheets-Sheet 6

Inventor
John J. Renard
by Dawson, Tilton, Fallon,
Lungmus & Alexander Attys

_United States Patent Office_ 3,213,731
Patented Oct. 26, 1965

3,213,731
PAPER LOG CUTTING APPARATUS
John J. Renard, 1541 Harold St., Green Bay, Wis.
Filed Aug. 4, 1964, Ser. No. 387,288
9 Claims. (Cl. 83—174)

This invention relates to apparatus for cutting paper logs, and, more particularly, for the cutting of elongated rolls of paper webs such as toilet tissue and toweling whereby the same may be transversely severed into retail-sized lengths.

This application is a continuation-in-part of my applications Ser. No. 762,585, filed Sept. 22, 1958 (now abandoned), and Ser. No. 247,433, filed Nov. 28, 1962.

In the above-mentioned specific environment for the invention, small rolls of toilet tissue and toweling are developed from jumbo rolls (often averaging five or more feet in diameter, with corresponding lengths) through the use of a rewinder. This device, in addition to rewinding the web into smaller diameter rolls, transversely perforates the webs so as to permit the detachment of the well-known squares—in the case of toilet tissue in the United States, squares 4½" on a side. The web being rewound to form the smaller rolls is often quite wide—upwards of 90" or more—so as to develop 20 or more toilet paper-sized rolls, the sheet in such case being designated a "20 wide" sheet.

In the past, it has been the practice to take a log of the diameter of a toilet paper roll, for example, and 90" long, and pass it through a reciprocating saw so as to develop the individual rolls. This took the form of the widely used "Gilbertville" saw and, more recently, the structure seen in U.S. Patent 3,049,954. These prior art saws suffered from a number of drawbacks, particularly attributable to the slowing down of the saw movement as it reached the end of the cut so as to accommodate the reverse movement during the reciprocation. This yielded a longer residence time of the saw in the log and, as a consequence, generated more heat, frequently causing distortion of the saw. The reciprocal movement of the saw (going into and out of the log in opposite directions) required the logs to be clamped and also tended to distort the paperboard cores and the convolutions of webs, so that a biased cut roll resulted. This not only detracted from the appearance of the roll, but also caused problems in subsequent packaging, storage, etc.

It is a general object of this invention to provide a new mode of log severing which avoids the problems and drawbacks outlined above.

Another object of the invention is to provide a saw mounted for orbital movement wherein uniform cutting pressure is developed irrespective of the position of the saw and which facilitates the development of smooth saw cuts at high speed.

A further object of the invention is to provide a saw mechanism which includes a log conveyor synchronized and arranged so that the conveyor operates continuously, as contrasted to the prior restriction of intermittent conveyor operation.

Still another object of the invention is to provide a log saw mechanism which includes a log conveyor synchronized and arranged so that the conveyor and saw mechanism may be selectively operated as where a "no trim" log is being severed.

Other objects and advantages of the invention may be seen in the details of construction and operation set down in this specification.

The invention will be described in conjunction with several embodiments thereof in the accompanying drawing, in which:

FIG. 1 is a leaving end elevational view of one embodiment of apparatus constructed according to the inventive teachings;

FIG. 2 is a side elevational view of the apparatus seen in FIG. 1;

FIG. 3 is an entering end elevational view of the apparatus of FIGS. 1 and 2;

FIG. 4 is a plan view of the apparatus of FIGS. 1–3;

FIG. 5 is an exploded perspective view of the driving means for the orbital saw;

FIG. 6 is a fragmentary perspective view of the cutting and drive elements of a modified form of the invention;

FIGS. 7 and 8 are enlarged fragmentary perspective views of the apparatus immediately adjacent the orbital saw;

FIG. 9 is a side elevational view of the rear or drive side of a modified form of apparatus;

FIG. 10 is a fragmentary perspective view of yet another form of the invention wherein the orbital saw advances in synchronism with the conveyor so as to eliminate the need for intermittent conveyor operation;

FIG. 11 is a fragmentary enlarged elevational view, partially in section, of the drive portion of the orbital saw of FIG. 10;

FIG. 12 is a perspective view of a log of the type severed according to the invention.

Figure 13:
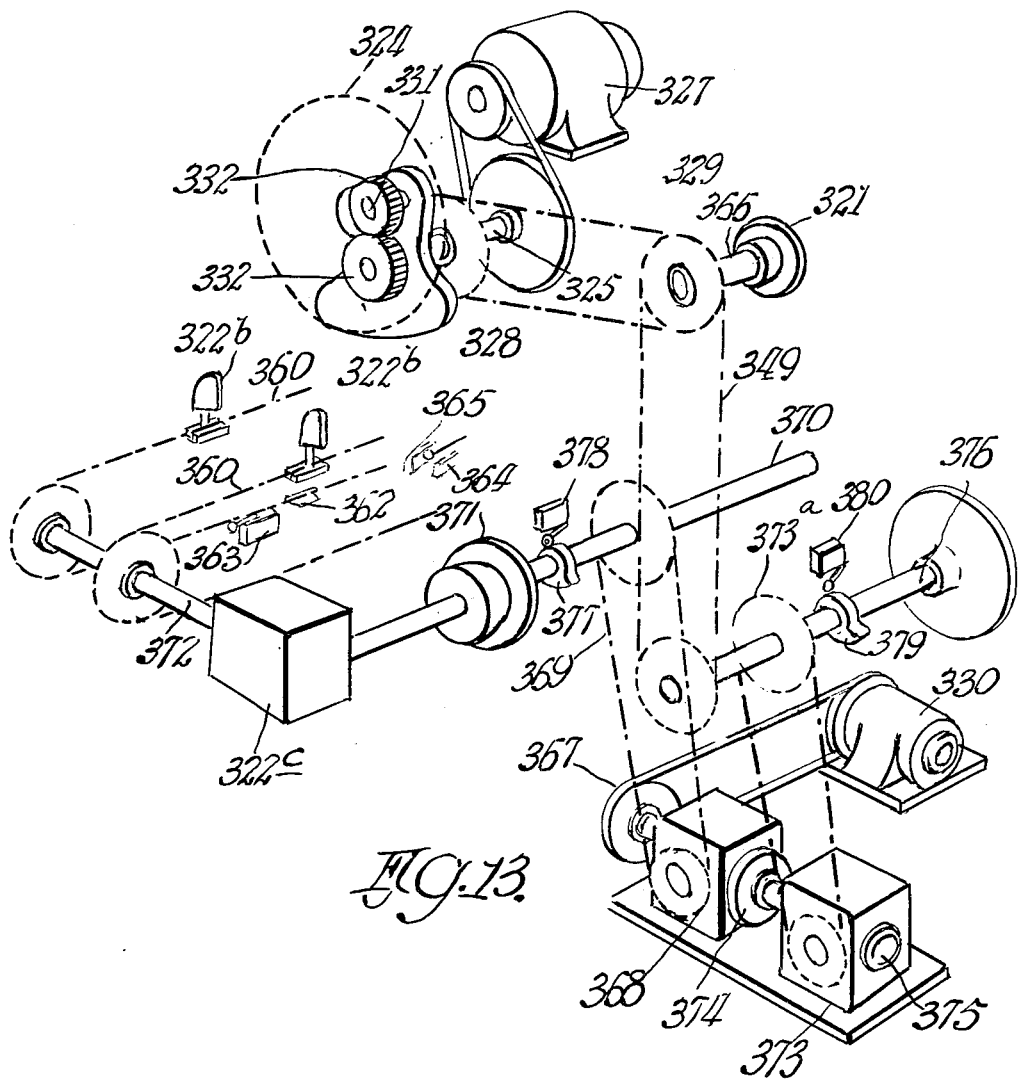
FIG. 13 is a schematic perspective view of a modified form of the invention wherein mechanism is shown for controlling the operation of the saw as a function of the length of the log being transversely severed.

With reference to the first sheet of drawings, there is seen a simplified version of the invention wherein the numeral 20 designates a supporting frame carrying a superstructure generally designated 21. In addition to the superstructure 21, the frame 20 carries an elongated trough 22 which is interrupted as at 23 to provide a path for the travel of an orbiting blade 24.

Generally, the operation of the invention contemplates a log of paper being advanced in the trough 22 and intermittently severed at longitudinally spaced points by virtue of the blade 24 moving through the log.

For this purpose, the superstructure 21 rotatably supports a main drive shaft 25. The drive shaft 25 is driven through a belt and pulley system generally designated 26 from a motor 27—the sheave associated with the main drive shaft 25 being designated by the numeral 26a in FIG. 5.

Rotatably mounted on the drive shaft 25 is a disc wheel 28 (see particularly FIG. 5) and which is equipped with a hub portion 28a. Entrained in the hub portion 28a is a drive generally designated 29 deriving power from a motor generally designated 30 and which, in the FIG. 1 embodiment, like the motor 27, is mounted on the superstructure 21.

The disc wheel 28 is equipped with an eccentric bore as at 28b in which a shaft 31 is journaled. The saw or driven shaft 31 and the main drive shaft 25 are each equipped with gears as at 32 and 32a, respectively, so that rotation of the drive shaft 25 results in rotation of the blade 24 which is also fixed on the shaft 31.

In the operation of the device, the blade 24 is rotated by virtue of energizing the motor 27, the motor 27 transferring rotative power through the drive 26 to the main shaft 25. The rotation of the main shaft 25 is transferred through the gears 32a and 32 to the shaft 31 which carries the disc blade 24.

To develop the orbital movement of the disc blade 24, the motor 30 is energized, which transfers rotative power through the drive 29 to the disc wheel 28, causing the disc wheel 28 to rotate and, because of the eccentric location of the shaft 31 therein, results in a planetary motion being imparted to the shaft 31 and hence the disc blade 24.

In FIGS. 6–8, fragmentary perspective views of a modified form of the invention are seen, and it will be noted that the superstructure generally designated 121 is equipped with a positionable beam member 121a which carries the disc wheel 128, blade 124, and the associated shafting. The beam 121a is positionably related with respect to the remainder of the superstructure 121 by means of a threaded member 134 pivoted on the superstructure as at 134a. The threaded member 134 threadedly engages an integral block 121b provided as part of the beam 121a so as to lower the disc blade 124 when the same becomes worn and thus of smaller diameter.

Also seen in FIGS. 6 and 8 is a grinding wheel arrangement generally designated 135 and which includes grinding wheels 136 and 137 inclined relative to each other and to the plane of the blade 124 so as to develop a double beveled edge on the blade 124. The grinding mechanism 135 is mounted on a cantilevered beam portion 121c provided as part of the superstructure 121, and the wheels 136 and 137 are each carried on the shafts of drive motors 136a and 137a, respectively. These motors 136a and 137a are advantageously operated continuously so that sharpening is achieved by moving the wheels 136 and 137 toward each other by means of the solenoids 137b and 137c. Sharpening occurs at a point corresponding to about two o'clock in the orbit wherein the saw blade 124 is fully clear of the log L (see FIG. 12) and the rolls R issuing from the cutting operation in the troughs 122. As is brought out more in detail hereinafter, the blade 124 may be stopped at the end of each log (where the log has been properly trimmed to length previously) and at which time the grinding wheels operate against the blade. Coolant may be provided via the jet 135a (see FIG. 6).

The trough arrangement can be seen more clearly in FIG. 7, and reference to that view shows two troughs 122 arranged in side-by-side relation spaced on opposite sides of the nadir of the orbit of the disc blade 124.

Logs L may be controlled during advancement in the trough 122 toward the slot 123 by means of floating feed belts generally designated 138. Each belt includes a plastic endless belt 139 entrained about end rollers, one of which is seen for each belt at 140. The end rollers 140 are carried by side frames 141, and the side frames 141 are supported in floating relation to the main frame 120 by means of arms 142 which limit the downward movement of the side frames 141 by virtue of engaging the clips 141a fixed to side frames 141.

The troughs 122 are equipped with slots as at 122a to permit the entry of a conveyor pusher 122b (see FIG. 7) to conduct the logs L toward the cutting station defined by the slot 123. The conveyor chain carrying the pushers 122b may be indexed intermittently by a cam unit 122c (see FIG. 8). A suitable roll removal conveyor may be provided as at 152 in FIG. 9.

The troughs 122 may be equipped with closure portions as at 143 to guide and hold the end of a log relatively securely during cutting to give good cuts. The closures 143 are seen to be pivotally supported upon a cross member 144 and are also secured to a block 145, a downward pressure being exerted by means of the springs 146.

Inasmuch as the orbiting blade 124 is moving generally horizontally during the cutting operation, and because there is no reciprocation, the sawing operation being characterized by only downward and forward movement of the blade 124, it is unnecessary to tightly clamp the logs, as was the previous practice. With the instant construction, indexing is achieved during the upper half of the orbit of the disc blade 124, the blade entering the log in the right-hand trough in FIGS. 6 and 7, for example, at about four o'clock during orbit.

Both the rotational and orbital speeds of the blade 124 can be increased substantially over those known heretofore because of the dynamic balancing in the system. In one aspect, this is enhanced through the use of a counterweight as at 147 in FIG. 6, the counterweight 147 being carried on the disc wheel 128. The blade 124 develops a "slashing" cut in the nature of drawing a knife through the log to be severed. The high speed, continuous operation is also facilitated through the use of the simplified power transmission system described in connection with FIG. 1. In the FIG. 6 embodiment, the disc wheel 128 is chain-driven as at 129, and the gears for driving the blade shaft 131 are completely enclosed in a housing portion as at 148.

A complete view of an embodiment of the machine shown fragmentarily in FIGS. 6–8 can be seen in FIG. 9, which reveals that the drive 129 for the disc wheel 128 is provided from a second drive generally designated 149 and which derives power through an overload clutch 150 interconnecting the drive 149 with the motor 130. In the FIG. 9 modification, the motor 130 is mounted on the base of frame 120, as contrasted to the mounting of the motor 30 on the superstructure 21 in the modification shown in FIGS. 1–5.

In the operation of the device seen in FIG. 9, the logs are deposited on the troughs 122 and are moved forwardly into the cutting zone by means of a conveyor 151 (carrying the pushers 122b) to be transversely severed by the orbiting blade 124, the individual rolls being removed by the belt conveyor 152. A limit switch 153 is mounted on each of the troughs 122 to sense the forward end of a log and deliver a signal to a control center 154 for controlling the orbital motion of the blade 124. Thus, when a log has been properly trimmed to provide an exact length for an integral number of rolls, the blade 124 has its orbital movement stopped for at least one indexing of the log corresponding to the cut which ordinarily would trim off a less-than-roll length from the end of the log.

A further modification of the invention is seen in FIGS. 10 and 11, and in this arrangement, indexing of the conveyor is eliminated—the belts 139 being operated continuously and the saw 224 advancing with the log during the cutting operation and returning to start-up position during that portion of the orbit in which the saw 224 is above the log L.

For this purpose, the eccentric shaft 231 is equipped with a longitudinally-extending groove or spline as at 231a which permits longitudinal movement of the shaft 231 relative to its spur gear 232, the gear 232 having a key portion 232a received in the groove 231a (see FIG. 10). The shaft 231 carries a cap 255 which supports a cam roller 256.

A sleeve 257 is rigidly mounted on the adjustable cross beam 221 and the sleeve 257 is equipped with a helically contoured slot 258. Thus, as the shaft 225 is rotated, the blade 224 not only orbits, but also reciprocates axially by virtue of the cam roller 256 riding in the cam groove 258. The groove 258 is seen to have its rearmost part at the top (as at twelve o'clock) and designated 258a in FIG. 10, while the most forward portion of the slot 258 (relative to the direction of log movement) is at that part of the sleeve 257 coinciding with the blade swinging clear of the last log.

In FIG. 11, there is provided a bucket conveyor generally designated 259 wherein a chain 260 articulatably carries buckets 261 which move continuously with the log L and, subsequently, with rolls R. The buckets 261 are spaced apart to permit entry therebetween of blade 224.

Now referring to FIG. 13, apparatus is seen in detail which is especially adapted to sever a log which has been previously trimmed to the exact length of an integral number of retail-sized paper rolls. In this case, the saw orbit is stopped during indexing of the final roll in the log and the indexing in of the lead roll of the following log. Thus, the following is a description of the saw drive when the stopping of the saw orbit is required for the "no trim" condition.

In FIG. 13, and focussing upon the upper central portion of the drawing, it will be seen that the numeral 324 again designates the circular saw blade and the numeral 328 the disc wheel which carries the blade 324 through its circular orbit. For advancing a roll past the saw blade (intermittent fashion), the structure of FIG. 13 again employs pushers 322b, which are seen to be coupled to chains 360 (depicted schematically). The numeral 362 designates an actuating lug coupled to one of the chains 360 which acts in conjunction with a switch 363 provided on the superstructure 321 employed for stopping the orbit of the saw as the end of a given log is approached. The numerals 364 and 365 designate, respectively, a switch for starting up the conveyor chains 360 and a lug for actuating the switch 364.

The saw mechanism, working in conjunction with the conveyor chains 360, including the blade 324, is mounted on shaft 331 suitably journaled in the disc wheel 328. A motor 327 drives an intermediate shaft 325 which is coupled to the blade shaft 331 by means of gears 332 and 332a. Thus, the planetary drive for the disc wheel 324 is the same as before. The means for driving the disc wheel 328 will now be described.

The drive for the disc wheel 328 includes a first sprocket and chain drive 329, which is coupled to a second sprocket and chain drive 349 via an idler shaft 366 suitably journaled in the frame superstructure 321. To deliver power to both the second drive 349 and to the conveyor chains 360, a motor 330 is employed (see the lower right-hand portion of FIG. 13). The output of the motor 330 is coupled by means of a V-belt drive 367 to a right angle gear box 368. The gear box 368 has a first output delivered through a chain and sprocket drive 369 to a line shaft 370 suitably carried by the frame of the machine. The output of the shaft 370 is delivered through an overload clutch 371 to the indexing device 322c. The output of the indexing device 322c is delivered to a head shaft 372 coupled to the chains 360.

Power from the motor 330 is delivered to the disc wheel 328 by virtue of a coupling between the first right angle gear box 368 and a second right angle gear box 373 (again refer to the lower right-hand portion of FIG. 13). Interposed between the gear boxes 368 and 373 is an electric clutch 374. Opposite the clutch on the gear box 373 is an electric brake 375 which is attached to the frame of the machine. The output of the second gear box 373 is delivered through a chain and sprocket drive 373a to an idler shaft 376 which is seen to be coupled to the second chain and sprocket drive 349, thereby completing the power train to the disc wheel 328.

Control means are provided on the shafts 370 and 376 as follows: The shaft 370 is equipped with a cam 377 coacting with a switch 378 for the purpose of starting up the conveyor chains 360 while the shaft 376 is equipped with a cam 379 associated with a switch 380 for the purpose of stopping the orbit of the disc saw 324.

More particularly, when the blade 324 has made the last cut on a log and the conveyor chains 360 start indexing, the switch 363 is actuated by the lug 362 to energize the switch 380.

At approximately the midpoint of the same index, or when the saw blade 324 is in a vertical position, a switch 380 is operated by the cam 379 on the shaft 376. This releases the clutch 374 and applies the brake 375. Optimally, the brake voltage can be adjusted to allow the brake to slip so that the saw 324 will stop smoothly in the sharpening position, i.e., in a position of engagement with the sharpening wheels 136 and 137 (see FIG. 8).

At this stage, the drive shaft 376 is stopped and so is the disc wheel or segment 328. To start the orbiting mechanism once again, a signal is provided by the continually operating chains 360. Here, it will be appreciated that the motor 330 operates continuously, and so does the right angle gear box 368. It is only the straight-ahead output of the right angle gear box 368 which is disconnected by virtue of the clutch 374. Thus, the line shaft 370 continues rotating so that the cam 377 continues to cyclically close the switch 378. The switch 378 is suitably interconnected with the brake and clutch mechanisms to reenergize these upon suitable signal from the switch 364. In other words, as the lug 365 closes the switch 364, the switch 378 becomes energized so as to release the brake 375 and engage the clutch 374. This starts the orbiting of the saw blade 124 in synchronization with the log indexing drive.

While, in the foregoing specification, a detailed description of the invention has been set down for the purpose of explanation thereof, many variations in the details herein given may be made by those skilled in the art without departing from the spirit and scope of the invention.

I claim:
1. In an orbital saw for radially cutting paper rolls, and the like, a frame, a first shaft journaled in said frame only for rotation about the shaft axis, first motor means on said frame coupled to said first shaft for rotating the same, disc means rotatably mounted on said shaft, a second shaft journaled in said disc means eccentric to said first shaft and having a disc saw fixed thereto, gear means interconnecting said first shaft and second shaft for transmitting rotational power from said first motor means to said disc saw, second motor means in said frame coupled to said disc means for rotating the same, whereby said second shaft follows an orbital path about said first shaft, said second motor means being positioned on said frame laterally outside said orbital path, and a pair of roll-receiving and supporting troughs on said frame elongated in the axial direction of said first shaft, said troughs being coaxial and spaced apart to permit said disc saw to pass therebetween, said troughs being positioned at about the nadir of the orbital path of said disc saw whereby the cutting action is characterized by only downward and forward components of saw motion.

2. In apparatus for transversely sawing logs of tissue, toweling, and the like, to provide consumer-sized rolls, a frame equipped with conveyor means for axially advancing logs to be transversely severed, a pair of elongated, interrupted troughs mounted in side-by-side relation on said frame in alignment with said conveyor means, whereby logs are adapted to be advanced into said troughs and supported therein during cutting, a cross beam positionably mounted on said frame above said troughs and equipped with a drive shaft rotatably mounted therein and extending parallel to the length of said troughs, a wheel rotatably mounted on said drive shaft and equipped with a counterweight and a journal diametrically related to said counterweight, means on said frame for rotating said wheel independently of said drive shaft, a saw shaft rotatably mounted in said journal, gear means interconnecting said drive and saw shafts, means on said frame for rotating said drive shaft, and a disc saw fixed on said saw shaft whereby said saw is adapted to traverse said troughs at about the nadir of the orbit developed by the rotation of said wheel, and grinding wheel means on said frame for sharpening said saw adjacent the zenith of said orbit.

3. An orbital saw device, comprising a frame, a disc wheel rotatably mounted on said frame, a disc saw eccentrically mounted on said wheel for movement through a vertical orbit upon rotation of said disc wheel, means on said frame for rotating said disc saw independently of the rotation of said disc wheel, an interrupted trough extending through said orbit for supporting a log during cutting, pusher means mounted on said frame for indexing logs in said trough through said orbit, and a drive for said disc wheel connected and responsive to said pusher means for rotating said disc wheel upon each index except that corresponding to the end of a log, said drive including switch means interconnected with brake means for mechanically stopping said disc wheel.

4. The structure of claim 3 in which said frame is equipped with saw sharpening means, said brake means being arranged to stop said wheel when said saw is in engagement with said sharpening means, whereby said saw is sharpened upon the pusher means index corresponding to the end of a log.

5. An orbital saw device, comprising a frame, a disc wheel rotatably mounted on said frame, a disc saw eccentrically mounted on said wheel for movement through a vertical orbit upon rotation of said disc wheel, means on said frame for rotating said disc saw independently of the rotation of said disc wheel, pusher means mounted on said frame for indexing logs through said orbit, and a drive for said disc wheel responsive to said pusher means for rotating said disc wheel upon each index except that corresponding to the end of a log, said drive including a motor on said frame, first power transmission means coupling said motor to said wheel, second power transmission means coupling said motor to said pusher means, clutch and brake means interposed in said first power transmission means for disconnecting said motor from said wheel and stopping the rotation of said wheel, and switch means operably associated with said pusher means for selectively actuating and deactuating said clutch and brake means.

6. The structure of claim 5 in which said pusher means includes interconnected first and second switches, said second switch being responsive to operation of said first power transmission means whereby said wheel is adapted to be stopped with said saw at a predetermined point of its orbit.

7. The structure of claim 5 in which each transmission means includes a shaft journaled in said frame and carrying an actuator, a switch on said frame for each shaft adapted to be engaged by its associated actuator, first and second switches constituting said switch means and arranged in juxtaposition with said pusher means for sequential actuation thereby, said first switch and first transmission means switch being interconnected for stopping rotation of said wheel and said second switch and second transmission switch being interconnected for starting rotation of said wheel.

8. In apparatus for transversely sawing logs of tissue, toweling, and the like, to provide consumer-sized rolls, a frame equipped with conveyor means for axially advancing logs to be transversely severed, a pair of elongated, interrupted troughs mounted in side-by-side relation on said frame in alignment with said conveyor means, whereby logs are adapted to be advanced into said troughs, a cross beam positionably mounted on said frame above said troughs and equipped with a drive shaft rotatably mounted therein and extending parallel to the length of said troughs, a wheel rotatably mounted on said drive shaft and equipped with a counterweight and a journal diametrically related to said counterweight, means on said frame for rotating said wheel independently of said drive shaft, a saw shaft rotatably mounted in said journal, gear means interconnecting said drive and saw shafts, means on said frame for rotating said drive shaft, and a disc saw fixed on said saw shaft whereby said saw is adapted to traverse said troughs at about the nadir of the orbit developed by the rotation of said wheel, and grinding wheel means on said frame for sharpening said saw adjacent the zenith of said orbit, said means for rotating said wheel including a motor mounted on said frame, a clutch, brake and chain drive interconnecting said motor and said wheel, and switch means in the path of logs being advanced in said troughs coupled to said clutch and brake for selectively disconnecting said motor and braking said wheel.

9. In apparatus for transversely sawing logs of tissue, toweling, and the like, to provide consumer-sized rolls, a frame equipped with conveyor means for axially advancing logs to be transversely severed, a pair of elongated, interrupted troughs mounted in side-by-side relation on said frame in alignment with said conveyor means, whereby logs are adapted to be advanced into said troughs, a cross beam positionably mounted on said frame above said troughs and equipped with a drive shaft rotatably mounted therein and extending parallel to the length of said troughs, a wheel rotatably mounted on said drive shaft and equipped with a counterweight and a journal diametrically related to said counterweight, means on said frame for rotating sid wheel independently of said drive shaft, a saw shaft rotatably mounted in said journal, gear means interconnecting said drive and saw shafts, means on said frame for rotating said drive shaft, a disc saw fixed on said saw shaft whereby said saw is adapted to traverse said troughs at about the nadir of the orbit developed by the rotation of said wheel, and grinding wheel means on said frame for sharpening said saw adjacent the zenith of said orbit, said gear means including a pair of spur gears, one of which is mounted on said drive shaft and one of which is mounted on said saw shaft, said saw shaft being equipped with an elongated slot in the periphery thereof and the saw shaft gear being equipped with a key received in said slot, whereby said saw shaft is adapted to move relative to said saw shaft gear, a cam roller fixed to said saw shaft, and a helical camming groove provided on said frame receiving said cam roller.

References Cited by the Examiner

UNITED STATES PATENTS

| 572,374 | 12/96 | Richards | 83—174 |
|---|---|---|---|
| 1,201,842 | 10/16 | Maltby | 83—329 |
| 1,690,209 | 11/28 | Smith | 83—490 X |
| 2,013,303 | 9/35 | Garling | 83—329 X |
| 2,207,433 | 7/40 | Haswell | 82—174 X |
| 2,822,844 | 2/58 | Busch | 83—174 X |
| 3,049,954 | 8/62 | Barlament et al. | 83—207 X |

FOREIGN PATENTS 848,633  11/39  France.

ANDREW R. JUHASZ, *Primary Examiner.*